UNITED STATES PATENT OFFICE.

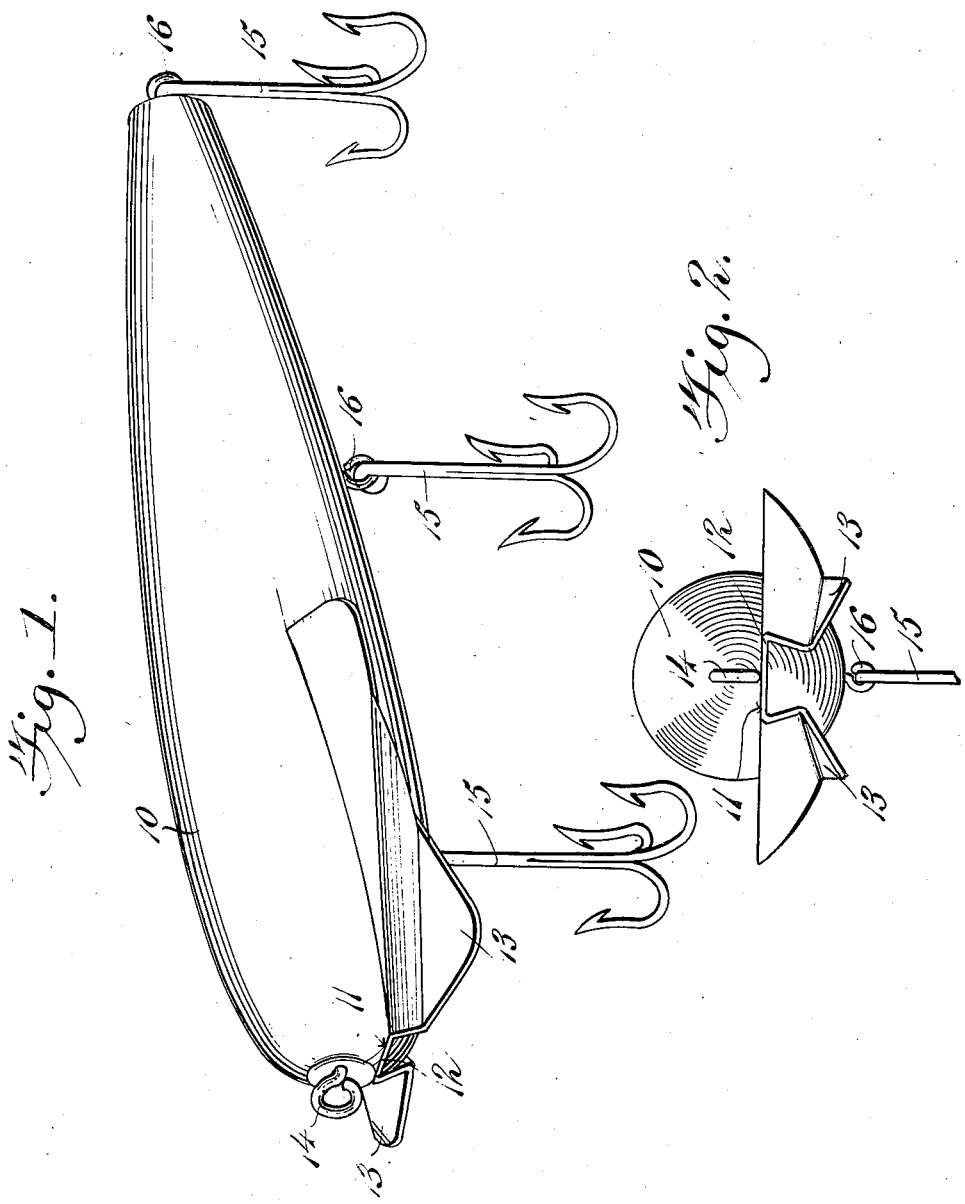

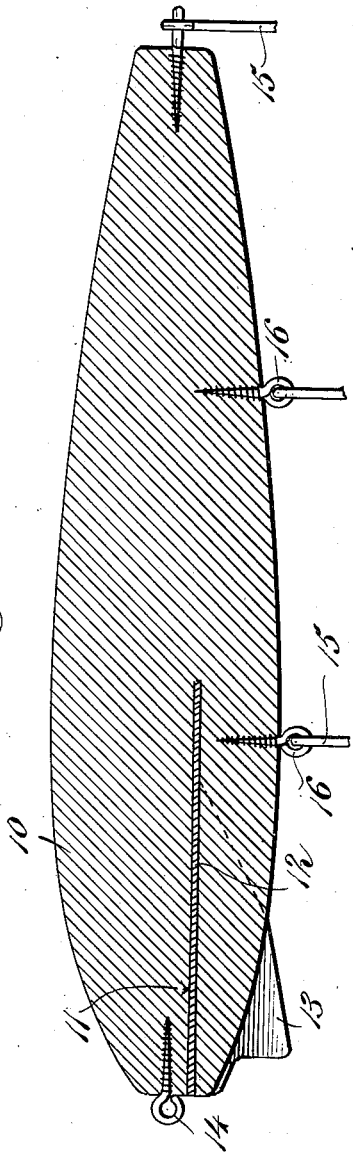
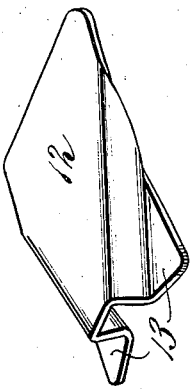
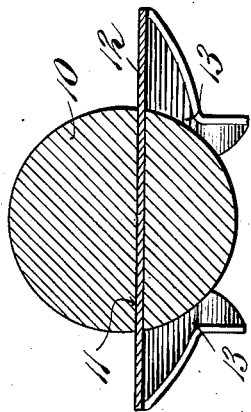

RICHARD T. WILSON, OF HASTINGS, MICHIGAN, ASSIGNOR OF ONE-HALF TO ABEN JOHNSON, OF HASTINGS, MICHIGAN.

ARTIFICIAL BAIT.

1,084,517.  Specification of Letters Patent.  Patented Jan. 13, 1914.

Application filed January 29, 1913. Serial No. 744,988.

*To all whom it may concern:*

Be it known that I, RICHARD T. WILSON, a citizen of the United States, residing at Hastings, in the county of Barry and State of Michigan, have invented new and useful Improvements in Artificial Bait, of which the following is a specification.

The invention relates to fishing and crabbing and more particularly to baits for use in connection with the same, and has for an object to provide an artificial bait for use in piscatorial pursuits.

The invention embodies, among other features, a fish-like body provided with a series of hooks and which is preferably used as an artificial bait in casting and trolling, with means on the body, whereby, when the body is drawn rapidly through the water, the body will advance in a zigzag fashion beneath the surface of the water, thus resembling the movements of a minnow or a fish such as are commonly used as live bait.

In the further disclosure of the invention reference is to be had to the accompanying drawings, constituting a part of this specification, in which similar characters of reference denote corresponding parts in all the views, and in which:

Figure 1 is a perspective view of the device; Fig. 2 is a front elevation; Fig. 3 is a vertical longitudinal sectional view; Fig. 4 is a vertical transverse sectional view; and Fig. 5 is a perspective view of the guiding plate, showing the manner of forming the fin members thereon.

Referring more particularly to the views, use is made of a fish-like body 10 provided with a longitudinally extending slit 11 formed at the front end of the body and in which is mounted a guiding plate 12, preferably formed of a single piece of sheet metal having the front edges thereof bent downwardly and inwardly and then bent outwardly or flared to form fin members 13. An eyelet 14 is secured to the front or head end of the body 10 for the purpose of attaching the body to a fishing line, and a series of hooks 15 are supported in depending position on the body 10 by means of suitable eyes 16 screwed into the body in the under side and rear end of the body, as shown.

The body 10 is preferably pointed or fashioned so that the body will present the appearance of a fish and when the device is drawn rapidly through the water the particular construction of the fin members 13, as described, will cause the body to be advanced through the water beneath the surface thereof and in a zigzag fashion. The body 10 is preferably formed of wood or cork and will readily float upon the surface of the water when the same is not being advanced through the water. It will be readily understood that the depth of the body 10 in the water, when the same is advanced in the water, depends upon the area and dimensions of the fin members 13 and the particular manner of forming the same, and it will be further understood that the fin members project in a flared manner from both sides of the forward end of the body, as shown in Figs. 1 and 2.

Having thus described my invention, I claim:

In an artificial bait, the combination with a fish-like body having a longitudinally extending horizontal slit projecting rearwardly from the head end of the body, of a guiding plate having its medial portion lying in the said slit and rigidly held on the body, with the edges of the guiding plate projecting beyond the sides of the body, and fin members formed integrally with the guiding plate by bending portions of the edges thereof downwardly and inwardly and then outwardly, with the said fin members inclined downwardly and forwardly from the rear end of the guiding plate and terminating at the head end of the said body.

In testimony whereof I affix my signature in presence of two witnesses.

RICHARD T. WILSON.

Witnesses:
F. C. UNDERHILL,
C. L. LANGSTON.